(12) United States Patent
Nibe (10) Patent No.: US 8,588,352 B2
(45) Date of Patent: Nov. 19, 2013

(54) WIRELESS DEVICE

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 12/756,297

(22) Filed: Apr. 8, 2010

(65) Prior Publication Data

US 2010/0290566 A1  Nov. 18, 2010

(30) Foreign Application Priority Data

May 18, 2009  (JP) .................................. 2009-120191

(51) Int. Cl.
*H04B 7/10* (2006.01)

(52) U.S. Cl.
USPC .......................................... 375/347; 375/219

(58) Field of Classification Search
USPC .................. 375/347; 370/468; 455/73, 130
See application file for complete search history.

(56) References Cited

U.S. PATENT DOCUMENTS

| | | | | |
|---|---|---|---|---|
| 7,266,167 | B2 * | 9/2007 | Murakami et al. | 375/347 |
| 7,463,871 | B2 * | 12/2008 | Li | 455/130 |
| 7,596,356 | B2 * | 9/2009 | Rofougaran et al. | 455/73 |
| 7,738,491 | B2 * | 6/2010 | Schuster et al. | 370/468 |
| 7,864,903 | B2 * | 1/2011 | Murakami et al. | 375/347 |
| 7,953,439 | B2 * | 5/2011 | Rofougaran | 455/557 |
| 8,023,599 | B2 * | 9/2011 | Tanaka et al. | 375/347 |
| 8,102,956 | B2 | 1/2012 | Dai et al. | |
| 2003/0026365 | A1 * | 2/2003 | Ho et al. | 375/347 |
| 2004/0213365 | A1 * | 10/2004 | Murakami et al. | 375/347 |
| 2006/0165199 | A1 * | 7/2006 | Takemoto et al. | 375/347 |
| 2006/0176970 | A1 | 8/2006 | Dai et al. | |
| 2007/0071078 | A1 | 3/2007 | Yoshida et al. | |
| 2009/0022177 | A1 * | 1/2009 | Schuster et al. | 370/468 |
| 2009/0274207 | A1 | 11/2009 | O'Keeffe et al. | |
| 2011/0261910 | A1 | 10/2011 | Dai et al. | |

FOREIGN PATENT DOCUMENTS

| | | |
|---|---|---|
| EP | 1 865 642 | 12/2007 |
| JP | 2000-209164 | 7/2000 |
| JP | 2004-104379 | 4/2004 |
| JP | 2006-512831 | 4/2006 |
| JP | 2007-28569 | 2/2007 |
| JP | 2007-96762 | 4/2007 |
| JP | 2008-512907 | 4/2008 |
| JP | 2009-76969 | 4/2009 |
| JP | 2010-537511 | 12/2010 |
| WO | 2004/059879 | 7/2004 |

OTHER PUBLICATIONS

Japanese Office Action dated Oct. 9, 2012, from corresponding Japanese Application No. 2009-120191.

* cited by examiner

*Primary Examiner* — Daniel Washburn
*Assistant Examiner* — Fitwi Hailegiorgis
(74) *Attorney, Agent, or Firm* — Katten Muchin Rosenman LLP (57) ABSTRACT

A wireless device is configured so that an RF-IC unit calculates a difference value between IQ data received by an antenna Ant1 and IQ data received by an antenna Ant2 and transfers the difference value to a base band processing unit, instead of the IQ data received by the antenna Ant2. The wireless device is further configured so that the base band processing unit reconstructs the IQ data corresponding to the antenna Ant2, based on the difference value and the IQ data received by the antenna Ant1.

8 Claims, 10 Drawing Sheets

WIRELESS DEVICE

CROSS-REFERENCE TO RELATED APPLICATION

This application is based upon and claims the benefit of priority of the prior Japanese Patent Application No. 2009-120191, filed on May 18, 2009, the entire contents of which are incorporated herein by reference.

FIELD

The embodiment discussed herein is directed to a wireless device.

BACKGROUND

Figure 7:
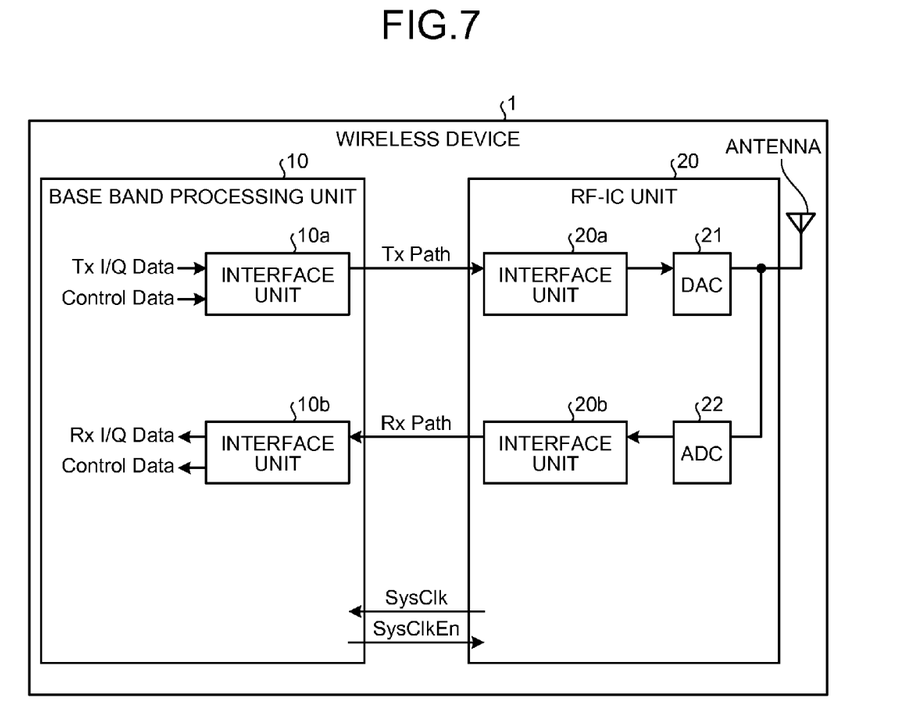
FIG. 7 is a diagram of a wireless device that is compliant with a DigRF v3 specification.

An interface standard specification called DigRF has recently been established in the field of portable terminals and the like. DigRF is a specification that defines mutual connectivity between a base band processing unit and a Radio-Frequency Integrated-Circuit (RF-IC) unit that are included in a portable terminal. FIG. 7 is a diagram of a wireless device that is compliant with a DigRF v3 specification.

As illustrated in FIG. 7, a wireless device 1 includes a base band processing unit 10 and an RF-IC unit 20. The base band processing unit 10 includes interface units 10a and 10b. The RF-IC unit 20 includes interface units 20a and 20b as well as a Digital-to-Analog Converter (DAC) 21, and an Analog-to-Digital Converter (ADC) 22.

The interface units 10a and 10b are processing units that transmit and receive IQ data (Tx I/Q Data and Rx I/Q data) containing information about phases and amplitudes and control data (Control Data, RF-IC response) to and from the RF-IC unit 20 via a Tx path and an Rx path, respectively. When transmitting and receiving the IQ data and the control data, the interface units 10a and 10b convert the IQ data and the control data into Low Voltage Differential Signaling (LVDS) signals corresponding to the Tx path and the Rx path.

The interface units 20a and 20b are processing units that transmit and receive the IQ data containing the information about the phases and the amplitudes and the control data to and from the base band processing unit 10 via the Tx path and the Rx path, respectively. When transmitting and receiving the IQ data and the control data, the interface units 20a and 20b convert the IQ data and the control data into LVDS signals corresponding to the Tx path and the Rx path.

When having obtained the IQ data from the base band processing unit 10 via the Tx path, the interface unit 20a outputs the obtained IQ data to the DAC 21. When having obtained the IQ data from the ADC 22, the interface unit 20b outputs the IQ data to the base band processing unit 10 via the Rx path.

The DAC 21 is a processing unit that converts a digital signal (i.e., IQ data) that has been output from the interface unit 20a into an analog signal and outputs the analog signal resulting from the conversion to an antenna. The ADC 22 converts an analog signal obtained from the antenna into a digital signal (i.e., IQ data) and outputs the digital signal resulting from the conversion to the interface unit 20b.

Figure 8:
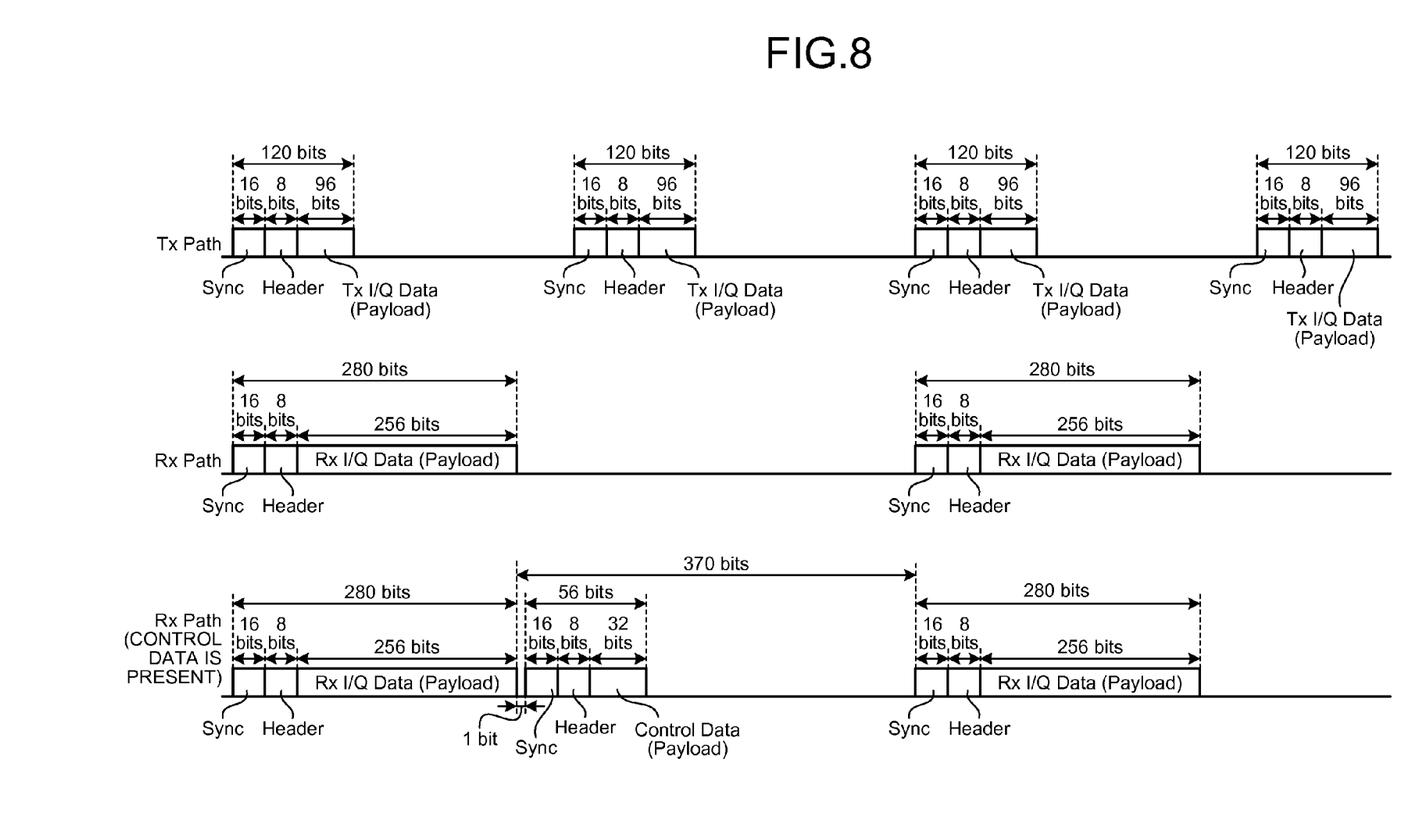
FIG. 8 is a drawing for explaining communication formats used on a conventional Tx path and a conventional Rx path.

Next, communication formats used on the Tx path and the Rx path will be explained. FIG. 8 is a drawing for explaining communication formats used on the conventional Tx path and the conventional Rx path. Data transferred on the Tx path and the Rx path includes a sync, a header, and a payload. Of these, the sync is a set of pattern bits made up of 16 bits and is used for detecting a synchronization. The header is a set of heading bits made up of 8 bits and is used for informing the type of data.

The payload is a set of data bits made up of a number of bits ranging from 8 bits to 512 bits. When transferring IQ data on the Tx path or the Rx path, the corresponding one of the interface units stores the IQ data into a payload. According to the DigRF v3 specification, the bit size of a payload on the Tx path is defined as 96 bits, whereas the bit size of a payload on the Rx path is defined as 256 bits. As illustrated in the upper portion of FIG. 8, when IQ data is transmitted on the Tx path, the IQ data is transferred in pieces of data each having 120 bits. Also, as illustrated in the middle portion of FIG. 8, when the IQ data is transmitted on the Rx path, the IQ data is transferred in pieces of data each having 280 bits.

Further, when transmitting the control data on the Tx path or the Rx path, the corresponding one of the interface units stores the control data into a payload. When storing the control data into a payload, the bit size of the payload is, for example, 32 bits.

As illustrated in the lower portion of FIG. 8, the interface unit transfers a piece of control data between two pieces of IQ data. In the case where the timing with which a piece of IQ data is transferred and the timing with which a piece of control data is transferred overlap each other, the interface unit waits until the transfer of the first piece of data is completed before transferring the second piece of data.

Figure 9:
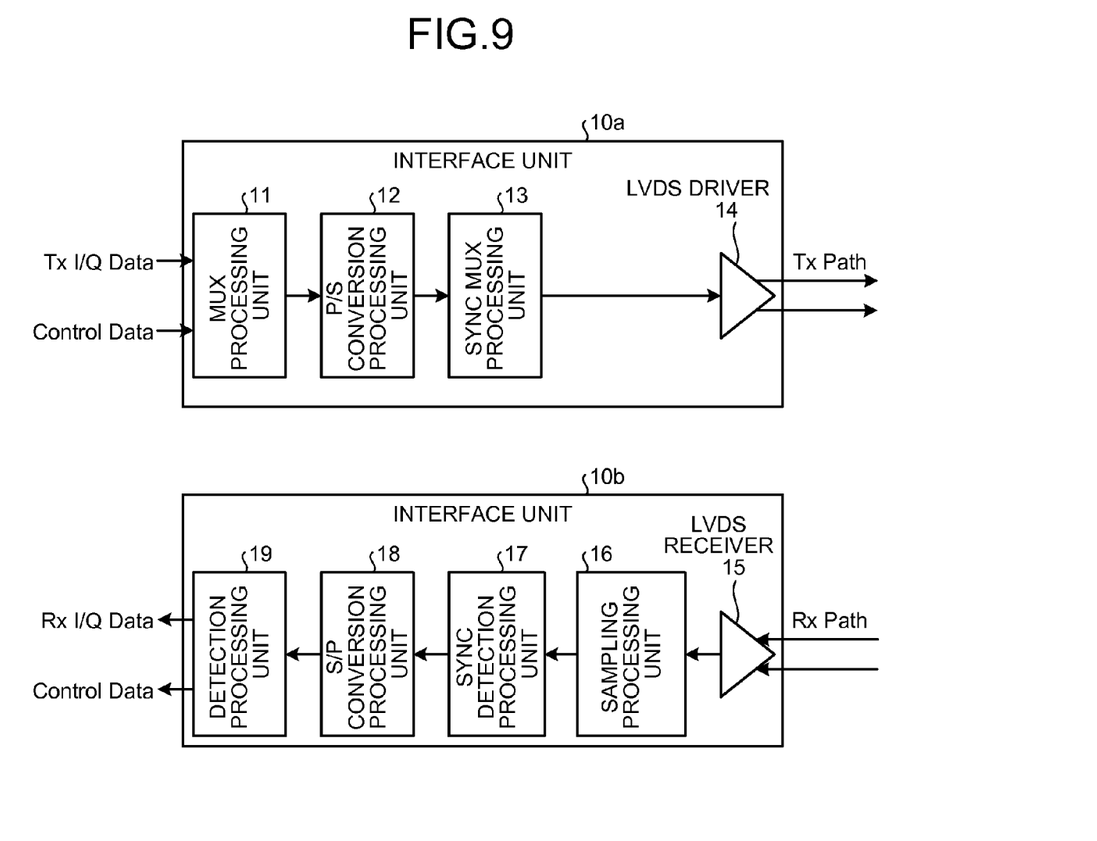
FIG. 9 is a diagram of conventional interface units.

Next, a configuration of the interface units 10a and 10b illustrated in FIG. 7 will be explained. FIG. 9 is a diagram of the conventional interface units. As illustrated in FIG. 9, the interface unit 10a includes a MUX processing unit 11, a Parallel/Serial (P/S) conversion processing unit 12, a sync MUX processing unit 13, and an LVDS driver 14. The interface unit 10b includes an LVDS receiver 15, a sampling processing unit 16, a sync detection processing unit 17, a Serial/Parallel (S/P) conversion processing unit 18, and a detection processing unit 19.

The MUX processing unit 11 is a processing unit that, when having obtained IQ data and control data, multiplexes the IQ data and the control data that have been obtained. The MUX processing unit 11 outputs the multiplexed data to the P/S conversion processing unit 12.

The P/S conversion processing unit 12 is a processing unit that, when having obtained multiplexed data from the MUX Processing unit 11, performs a serial conversion process. The P/S conversion processing unit 12 outputs the data on which the serial conversion process has been performed to the sync MUX processing unit 13.

The sync MUX Processing unit 13 is a processing unit that, when having obtained data on which a serial conversion process has been performed from the P/S conversion processing unit 12, appends a sync to the obtained data. The sync MUX processing unit 13 outputs the data to which the sync has been appended to the LVDS driver 14.

The LVDS driver 14 is a processing unit that, when having obtained data to which a sync has been appended from the sync MUX processing unit 13, converts the obtained data into an LVDS signal. In this situation, the LVDS signal contains a sync, a header, and a payload that are illustrated in FIG. 8. The LVDS driver 14 transfers data by storing IQ data or control data into a payload.

The LVDS receiver 15 is a processing unit that receives an LVDS signal from the RF-IC unit 20 and converts the received LVDS signal into a single signal. The LVDS receiver 15 outputs the single signal resulting from the conversion to the sampling processing unit 16.

The sampling processing unit 16 is a processing unit that, when having obtained a single signal from the LVDS receiver 15, performs a sampling process on the single signal. The sampling processing unit 16 outputs the data that is a result of the sampling process to the sync detection processing unit 17.

The sync detection processing unit 17 is a processing unit that, when having obtained the data that is a result of the sampling process from the sampling processing unit 16, detects the sync in the obtained data and performs a synchronization process by comparing and matching the detected sync with a sync pattern defined by the DigRF v3 specification. The sync detection processing unit 17 outputs the data on which the synchronization process has been performed to the S/P conversion processing unit 18.

The S/P conversion processing unit 18 is a processing unit that, when having obtained data from the sync detection processing unit 17, performs a parallel conversion process on the obtained data. The S/P conversion processing unit 18 outputs the data on which the parallel conversion process has been performed to the detection processing unit 19.

When having obtained data from the S/P conversion processing unit 18, the detection processing unit 19 analyzes the header contained in the obtained data and extracts the IQ data (Rx I/Q Data) or the control data (RF-IC Response) that is stored in the payload within the data. The detection processing unit 19 outputs IQ data and control data separately to an external device.

As another example, besides the wireless device 1 illustrated in FIG. 7, a wireless device that utilizes a technique called "diversity" has been proposed. For example, diversity is a technique by which, among mutually the same wireless signals that have been received by a plurality of antennas, the signal that has been received by the antenna having a better radio wave condition is used with a higher priority.

Figure 10:
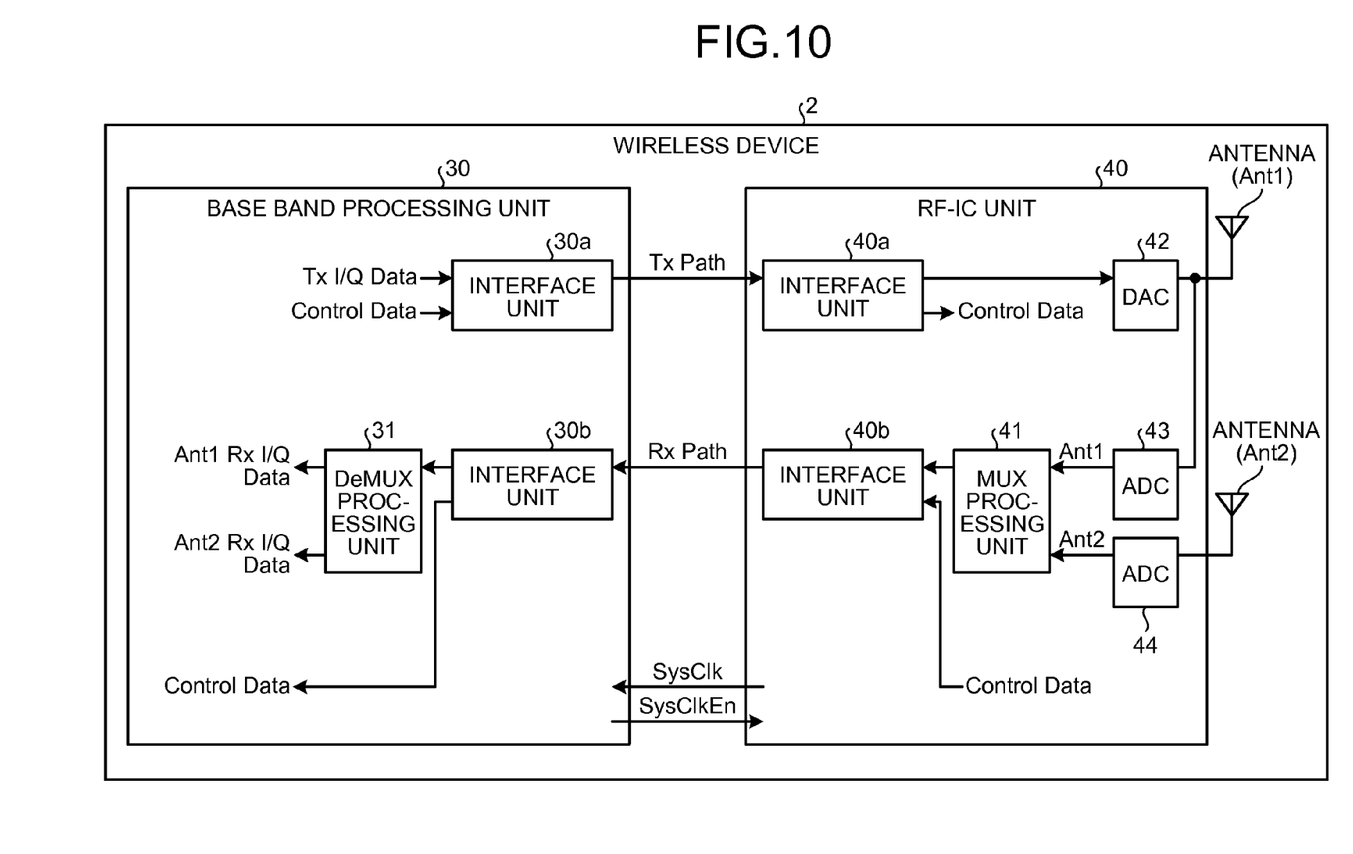
FIG. 10 is a diagram of a wireless device in which a diversity technique is used.

FIG. 10 is a diagram of a wireless device in which the diversity technique is used. As illustrated in FIG. 10, a wireless device 2 includes a base band processing unit 30 and an RF-IC unit 40. The base band processing unit 30 includes interface units 30a and 30b and a DeMUX processing unit 31. The RF-IC unit 40 includes interface units 40a and 40b, as well as a MUX processing unit 41, a DAC 42, and ADCs 43 and 44. In the wireless device 2 illustrated in FIG. 10, the signals that have been received by antennas are transferred from the RF-IC unit 40 to the base band processing unit 30 by using one lane.

The interface unit 30a is a processing unit that, when having obtained IQ data or control data, outputs the IQ data or the control data to the RF-IC unit 40 via a Tx path by converting the obtained data into an LVDS signal.

The interface unit 30b is a processing unit that receives an LVDS signal from the RF-IC unit 40 via an Rx path and extracts control data, IQ data received by an antenna Ant1, or IQ data received by an antenna Ant2 out of the received signal. The interface unit 30b outputs the IQ data received by the antenna Ant1 and the IQ data received by the antenna Ant2 to the DeMUX processing unit 31. Also, the interface unit 30b outputs the control data to an external device.

The DeMUX processing unit 31 is a processing unit that separates the IQ data that has been received by the antenna Ant1 and the IQ data that has been received by the antenna Ant2 from each other and outputs the separated pieces of IQ data separately.

The interface unit 40a is a processing unit that, when having obtained an LVDS signal from the base band processing unit 30 via the Tx path, outputs the IQ data contained in the obtained LVDS signal to the DAC 42.

The interface unit 40b is a processing unit that, when having obtained data that has been output by the MUX processing unit 41 or control data, outputs IQ data or the control data to the base band processing unit 30 via the Rx path by converting the obtained data to an LVDS signal.

The MUX processing unit 41 is a processing unit that combines the IQ data that has been output by the ADC 43 (i.e., the IQ data that has been received by the antenna Ant1) with the IQ data that has been output by the ADC 44 (i.e., the IQ data that has been received by the antenna Ant2) and outputs the combined data to the interface unit 40b.

The DAC 42 is a processing unit that converts a digital signal (i.e., IQ data) that has been output by the interface unit 40a into an analog signal and outputs the analog signal resulting from the conversion to the antenna Ant1.

The ADC 43 is a processing unit that converts an analog signal that has been obtained from the antenna Ant1 into a digital signal (i.e., IQ data) and outputs the digital signal resulting from the conversion to the interface unit 40b. The ADC 44 is a processing unit that converts an analog signal that has been obtained from the antenna Ant2 into a digital signal (i.e., IQ data) and outputs the digital signal resulting from the conversion to the interface unit 40b.

Figure 11:
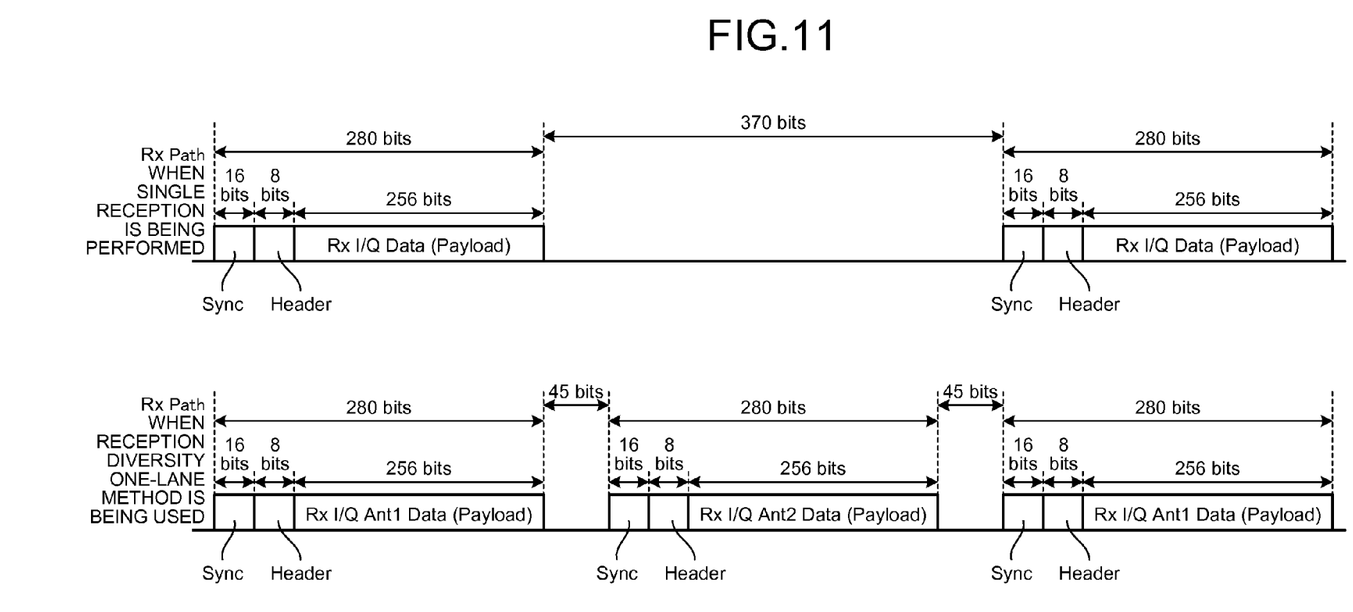
FIG. 11 is a drawing for explaining a communication format used on an Rx path when a diversity one-lane method is being used.

FIG. 11 is a drawing for explaining a communication format used on an Rx path when a diversity one-lane method is being used. In the upper portion of FIG. 11, LVDS signals on the Rx path in an example in which data has been received by the antenna Ant1 or the antenna Ant2 are illustrated. When a single reception like in the present example is performed, the bit interval between the LVDS signals is the same as the bit interval illustrated in FIG. 8 (i.e., the bit interval is 370 bits).

In the lower portion of FIG. 11, LVDS signals on the Rx path in an example in which, while the diversity technique is being used, pieces of IQ data received by the antennas Ant1 and Ant2 are multiplexed and transferred are illustrated. As illustrated in the lower portion of FIG. 11, when the diversity one-lane method is being used, the interface unit 40b transfers the pieces of IQ data on the antenna Ant1 side and the pieces of IQ data on the antenna Ant2 side alternately according to the time sequence. Also, each of the bit intervals between the LVDS signals is 45 bits, which is shorter than the bit interval that is used when the single reception is performed.

The conventional technique as described above is disclosed in for example Japanese Laid-open Patent Publication No. 2007-28569; and Japanese Laid-open Patent Publication No. 2007-96762.

Figure 12:
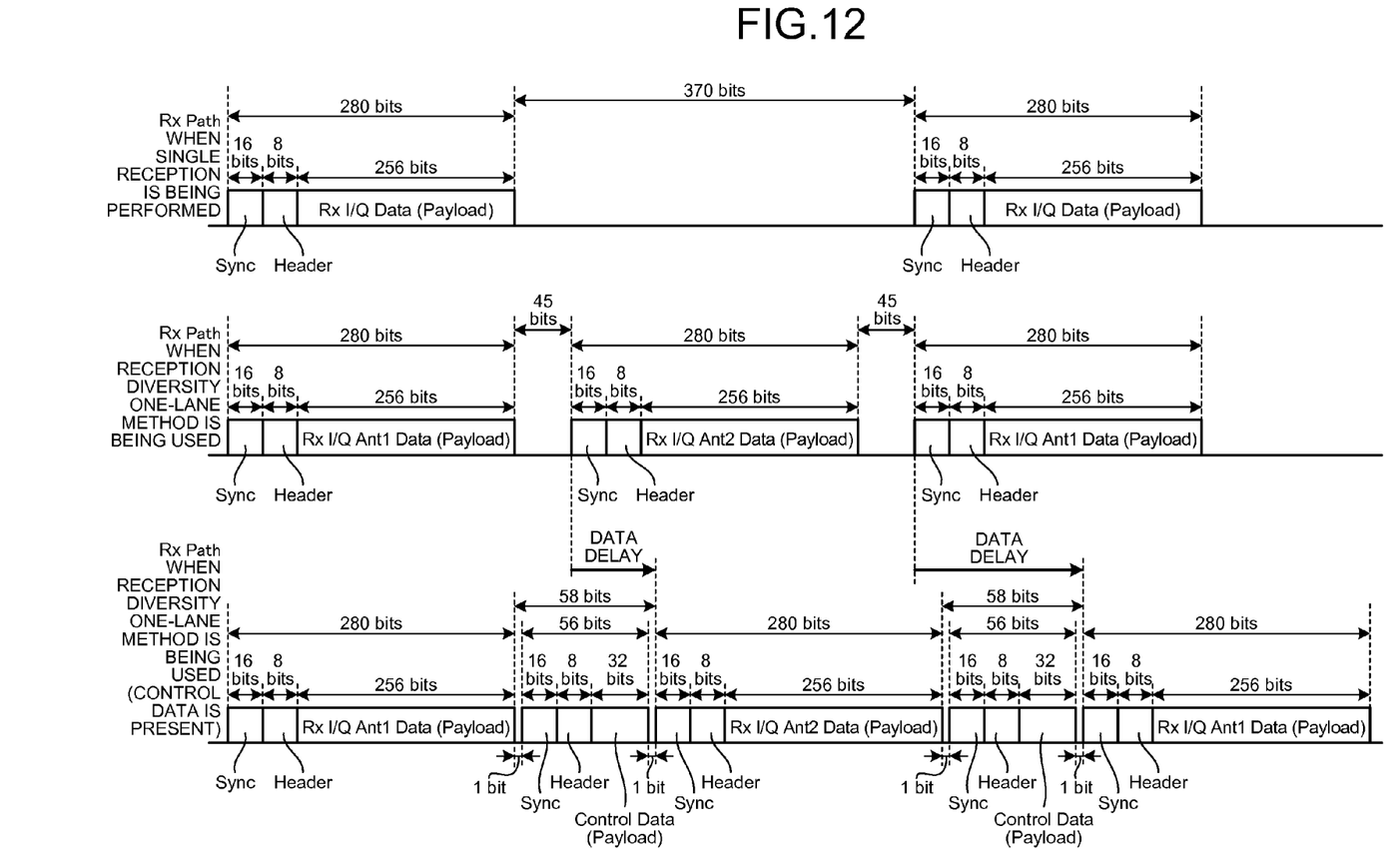
FIG. 12 is a drawing for explaining a problem of a conventional technique.

The conventional wireless device described above, however, has a problem where data delays are caused when pieces of IQ data that have been received by the plurality of antennas and the control data are transferred by using one lane. FIG. 12 is a drawing for explaining the problem of the conventional technique.

As illustrated in the lower portion of FIG. 12, when the diversity one-lane method is being used, the interval between the LVDS signals each containing IQ data is short. Thus, it is not possible to just insert and transfer control data. Accordingly, to transfer the control data, it is necessary to secure a bit width that allows the control data to be inserted by delaying the LVDS signals each containing the IQ data. As understood from comparing the middle portion of FIG. 12 with the lower portion of FIG. 12, inserting the control data causes delays for the IQ data and the control data that follow the inserted control data.

When data delays like the ones illustrated in FIG. 12 are caused, there is a possibility that, for example, a delay may be caused for the control data transferred from the reception side to the transmission side, and also, a buffer overflow may be caused on the transmission side where a certain process is performed after the control data has been received. For this reason, it is an important goal to solve the problem of data delays.

SUMMARY

According to an aspect of an embodiment of the invention, a wireless device includes a difference calculator that obtains first data received by a first antenna and second data received by a second antenna and calculates a difference value between the first data and the second data; and a transferring unit that transfers the first data and the difference value to a receiving unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

A preferred embodiment of the present invention will be explained with reference to accompanying drawings. The present invention is not limited to the exemplary embodiment.

In the following sections, an example in which a wireless device receives signal waves from a base station by using antennas Ant1 and Ant2 will be explained; however, the present invention is not limited to this example. The wireless device may receive a signal wave from a base station by using one or more antennas other than the antennas Ant1 and Ant2.

First, an overview of the wireless device according to the present embodiment will be explained. Because the antennas Ant1 and Ant2 receive mutually the same signal wave from the base station intrinsically, there is no large difference between IQ data received by the antenna Ant1 and IQ data received by the antenna Ant2, and these pieces of IQ data are correlated to each other. A main difference between the IQ data received by the antenna Ant1 and the IQ data received by the antenna Ant2 is a phase difference or the like that is caused by using mutually different propagation channels.

Thus, the wireless device according to the present embodiment calculates, on the RF-IC side, difference values between the IQ data received by the antenna Ant1 and the IQ data received by the antenna Ant2 according to the time sequence and transfers the difference values to the base band processing unit side, instead of the IQ data received by the antenna Ant2. The wireless device then reconstructs, on the base band processing unit side, the IQ data corresponding to the antenna Ant2 based on the difference values and the IQ data received by the antenna Ant1.

The data amount of each of the difference values is smaller than that of the IQ data received by the antenna Ant2. Thus, even if the wireless device is configured so that pieces of IQ data received by a plurality of antennas and control data are transferred by using one lane, it is possible to secure a bit width for the control data. Consequently, it is possible to prevent data delays.

Figure 1:
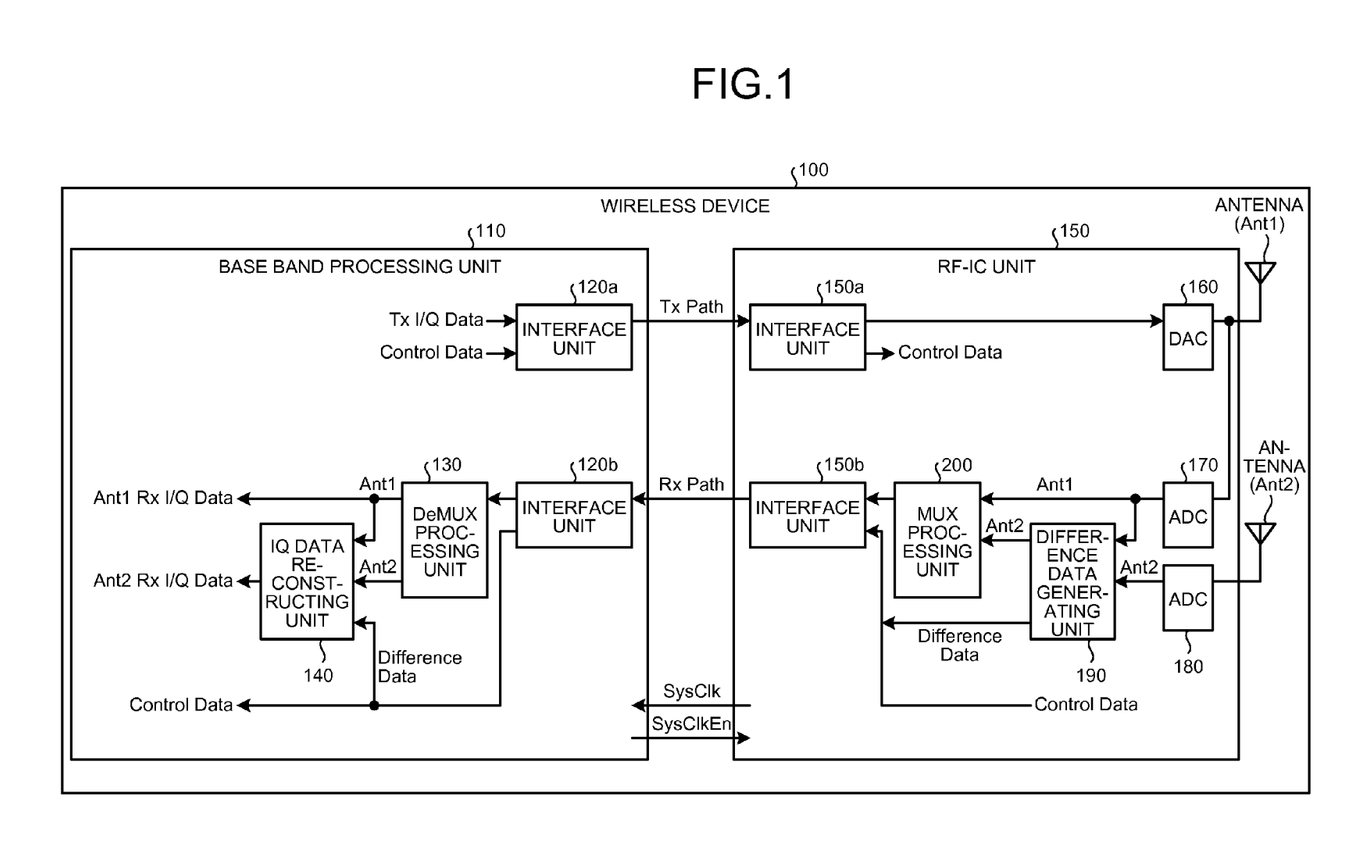
FIG. 1 is a functional block diagram of a wireless device according to an embodiment of the present invention.

Next, a configuration of the wireless device according to the present embodiment will be explained. FIG. 1 is a functional block diagram of a wireless device 100 according to the present embodiment. As illustrated in FIG. 1, the wireless device 100 includes a base band processing unit 110 and an RF-IC unit 150. The base band processing unit 110 and the RF-IC unit 150 are connected to each other by a Tx path and an Rx path, like in the example according to the conventional technique.

The base band processing unit 110 includes interface units 120a and 120b, as well as a DeMUX processing unit 130, and an IQ data reconstructing unit 140. The RF-IC unit 150 includes interface units 150a and 150b, as well as a DAC 160, ADCs 170 and 180, a difference data generating unit 190, and a MUX processing unit 200.

Next, processing units included in the base band processing unit 110 will be explained. The interface unit 120a is a processing unit that, when having obtained IQ data or control data, outputs the IQ data (Tx I/Q Data) or the control data (Control Data) to the RF-IC unit 150 via the Tx path by converting the obtained data into an LVDS signal.

The interface unit 120b is a processing unit that receives an LVDS signal from the RF-IC unit 150 via the Rx path and extracts control data, a difference value (Difference Data), or IQ data (Ant1 Rx I/Q Data) that has been received by the antenna Ant1, out of the received signal. The interface unit 120b outputs the IQ data that has been received by the antenna Ant1 to the DeMUX processing unit 130 and outputs the difference value to the IQ data reconstructing unit 140. The interface unit 120b outputs the control data to an external device.

In the case where a signal obtained from the interface unit 150b contains IQ data (Ant2 Rx I/Q data) that has been received by the antenna Ant2, the interface unit 120b outputs the IQ data that has been received by the antenna Ant2 to the DeMUX processing unit 130.

The DeMUX processing unit 130 is a processing unit that, when having received IQ data that has been received by the antenna Ant1 from the interface unit 120b, outputs the received IQ data to the IQ data reconstructing unit 140 and to an external device.

In the case where data received from the interface unit 120b contains both IQ data received by the antenna Ant1 and IQ data received by the antenna Ant2, the DeMUX processing unit 130 separates the IQ data received by the antenna Ant1 from the IQ data received by the antenna Ant2. The DeMUX processing unit 130 then outputs the IQ data received by the antenna Ant1 and the IQ data received by the antenna Ant2 to the IQ data reconstructing unit 140 and outputs the IQ data received by the antenna Ant1 to an external device.

The IQ data reconstructing unit 140 is a processing unit that reconstructs IQ data corresponding to the antenna Ant2, based on IQ data received by the antenna Ant1 and a difference value. For example, the IQ data reconstructing unit 140 reconstructs the IQ data corresponding to the antenna Ant2 by bringing each of the pieces of IQ data (i.e., the pieces of IQ data that are arranged according to the time sequence) received by the antenna Ant1 into correspondence with a different one of the difference values (i.e., the difference values arranged according to the time sequence) at each of different times and adding together the IQ data and the difference value that have been brought into correspondence with each other.

The IQ data reconstructing unit 140 outputs the IQ data corresponding to the antenna Ant2 that has been reconstructed to an external device. In the case where the IQ data reconstructing unit 140 has obtained IQ data received by the antenna Ant2 from the DeMUX processing unit 130, the IQ data reconstructing unit 140 outputs the obtained IQ data to an external device without performing the reconstructing process.

Next, processing units included in the RF-IC unit 150 will be explained. The interface unit 150*a* is a processing unit that, when having obtained an LVDS signal from the base band processing unit 110 via the Tx path, outputs the IQ data contained in the obtained LVDS signal to the DAC 160.

The interface unit 150*b* is a processing unit that, when having obtained data output by the MUX processing unit 200, control data, or a difference value, outputs IQ data, the control data, or the difference value to the base band processing unit 110 via the Rx path by converting the obtained data into an LVDS signal.

Figure 2:
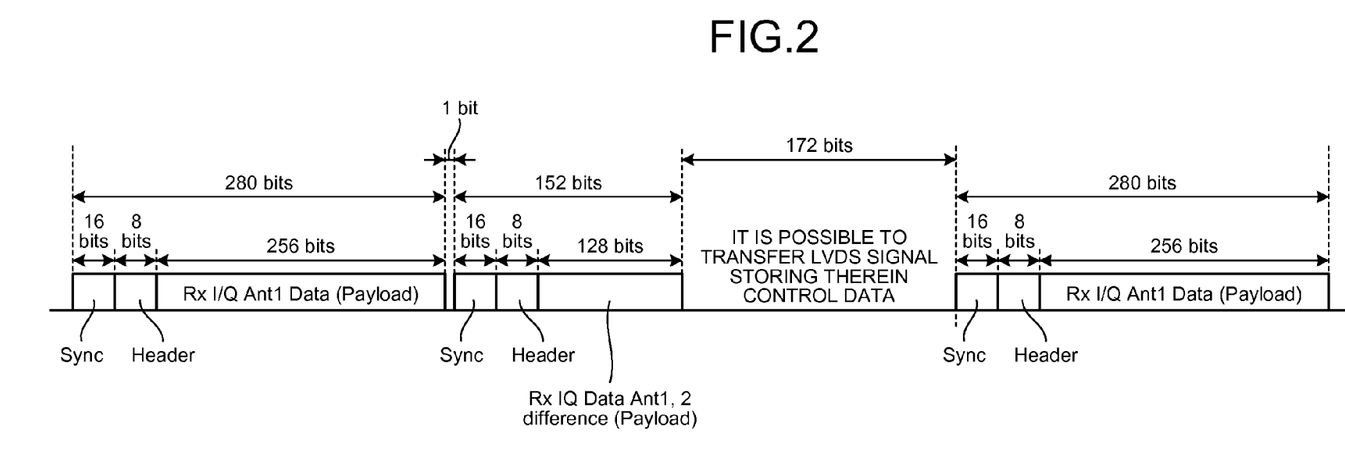
FIG. 2 is a drawing for explaining a communication format used on an Rx path according to the embodiment.

FIG. 2 is a drawing for explaining a communication format used on the Rx path according to the present embodiment. When having obtained the IQ data received by the antenna Ant1, the interface unit 150*b* stores the IQ data into a payload, appends a sync and a header to the payload, and transfers the payload with the appendixes to the base band processing unit 110. The bit width used for transferring the IQ data received by the antenna Ant1 is 280 bits.

When having obtained a difference value, the interface unit 150*b* stores the difference value into a payload having 128 bits, appends a sync and a header to the payload, and transfers the payload with the appendixes to the base band processing unit 110. The bit width used for transferring the difference value is 152 bits.

As illustrated in FIG. 2, the interface unit 150*b* transfers the LVDS signals each storing therein IQ data and the LVDS signals each storing therein a difference value alternately. As illustrated in FIG. 2, the interface unit 150*b* transmits an LVDS signal storing IQ data therein with a 172-bit interval after transferring an LVDS signal storing therein a difference value. When a bit width of 172 bits like this is present, it is possible to transfer an LVDS signal (56 bits) corresponding to the control data to the base band processing unit 110 without delaying the transfer of the IQ data or the transfer of the difference value.

When having obtained IQ data received by the antenna Ant1 and IQ data received by the antenna Ant2 from the MUX processing unit 200, the interface unit 150*b* transfers the pieces of IQ data on the antenna Ant1 side and the pieces of IQ data on the antenna Ant2 side alternately according to the time sequence, like in the conventional wireless device.

The DAC 160 is a processing unit that converts a digital signal (i.e., IQ data) that has been output by the interface unit 150*a* into an analog signal and outputs the analog signal resulting from the conversion to the antenna Ant1.

The ADC 170 is a processing unit that converts an analog signal that has been obtained from the antenna Ant1 into a digital signal (i.e., IQ data) and outputs the digital signal resulting from the conversion to the MUX processing unit 200 and to the difference data generating unit 190. The ADC 180 is a processing unit that converts an analog signal that has been obtained from the antenna Ant2 into a digital signal (i.e., IQ data) and outputs the digital signal resulting from the conversion to the difference data generating unit 190.

The difference data generating unit 190 is a processing unit that calculates a difference value between IQ data that has been obtained from the ADC 170 and IQ data that has been obtained from the ADC 180 for each of different times and outputs the calculated difference value to the interface unit 150*b*. In the case where the data amount of the difference value is equal to or larger than a threshold value, the difference data generating unit 190 outputs the IQ data that has been received by the antenna Ant2 to the MUX processing unit 200, instead of the difference value.

In the case where the MUX processing unit 200 has obtained only IQ data received by the antenna Ant1 from the ADC 170, the MUX processing unit 200 outputs the IQ data received by the antenna Ant1 to the interface unit 150*b*. In the case where the MUX processing unit 200 has obtained IQ data received by the antenna Ant1 from the ADC 170 and has obtained IQ data received by the antenna Ant2 from the difference data generating unit 190, the MUX processing unit 200 combines the pieces of IQ data together and outputs the combined pieces of IQ data to the interface unit 150*b*.

Figure 3:
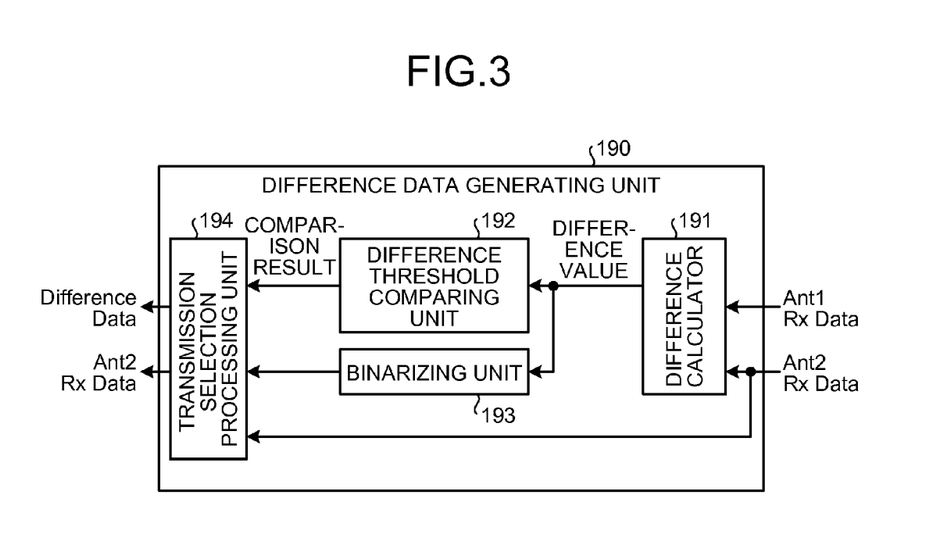
FIG. 3 is a diagram of a difference data generating unit.

Next, a configuration of the difference data generating unit 190 illustrated in FIG. 1 will be explained. FIG. 3 is a diagram of the difference data generating unit 190. As illustrated in FIG. 3, the difference data generating unit 190 includes a difference calculator 191, a difference threshold comparing unit 192, a binarizing unit 193, and a transmission selection processing unit 194.

The difference calculator 191 is a processing unit that calculates the difference value between the IQ data that has been obtained from the ADC 170 and the IQ data that has been obtained from the ADC 180 for each of the different times and outputs the calculated difference value to the difference threshold comparing unit 192 and the binarizing unit 193.

The difference threshold comparing unit 192 is a processing unit that compares the data amount of each of the difference values with the threshold value and judges whether the data amount of each of the difference values is equal to or larger than the threshold value. In the present example, the threshold value is assumed to be, for instance, 128 bits. The difference threshold comparing unit 192 outputs a comparison result to the transmission selection processing unit 194.

The binarizing unit 193 is a processing unit that, when having obtained a difference value from the difference calculator 191, converts the obtained difference value into bits. The binarizing unit 193 transmits the difference value that has been converted into the bits to the transmission selection processing unit 194.

The transmission selection processing unit 194 is a processing unit that, based on a comparison result from the difference threshold comparing unit 192, outputs a difference value or IQ data received by the antenna Ant2 to the interface unit 150*b*. More specifically, in the case where the data amount of the difference value is equal to or larger than the threshold value, the transmission selection processing unit 194 outputs the IQ data received by the antenna Ant2 to the interface unit 150b. In contrast, in the case where the data amount of the difference value is smaller than the threshold value, the transmission selection processing unit 194 outputs the difference value to the interface unit 150b.

Figure 4:
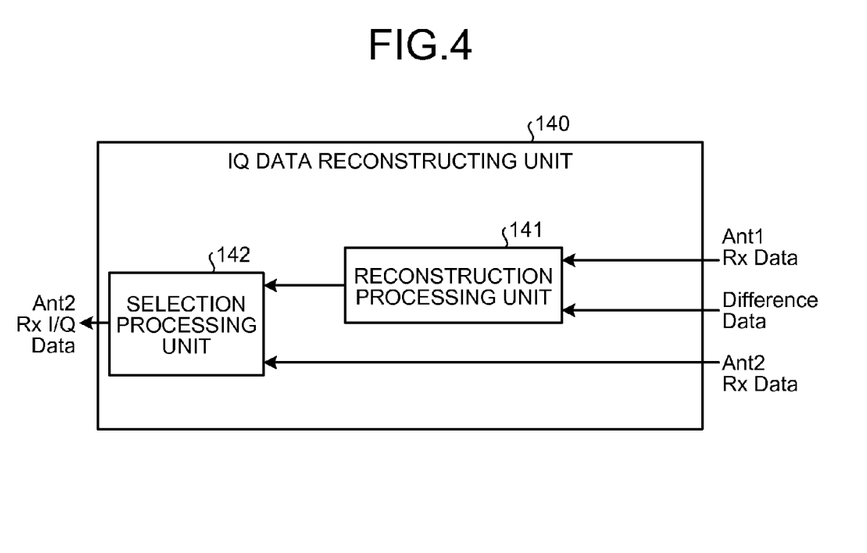
FIG. 4 is a diagram of an IQ data reconstructing unit.

Next, a configuration of the IQ data reconstructing unit 140 illustrated in FIG. 1 will be explained. FIG. 4 is a diagram of the IQ data reconstructing unit 140. As illustrated in FIG. 4, the IQ data reconstructing unit 140 includes a reconstruction processing unit 141 and a selection processing unit 142.

The reconstruction processing unit 141 is a processing unit that reconstructs IQ data corresponding to the antenna Ant2 based on IQ data received by the antenna Ant1 and a difference value. For example, the reconstruction processing unit 141 reconstructs the IQ data corresponding to the antenna Ant2 by bringing each of the pieces of IQ data (i.e., the pieces of IQ data arranged according to the time sequence) received by the antenna Ant1 into correspondence with a different one of the difference values (i.e., the difference values arranged according to the time sequence) at each of the different times and adding together the IQ data and the difference value that have been brought into correspondence with each other. The reconstruction processing unit 141 outputs the IQ data corresponding to the antenna Ant2 that has been reconstructed to the selection processing unit 142.

The selection processing unit 142 is a processing unit that selects one between the IQ data corresponding to the antenna Ant2 that has been output by the reconstruction processing unit 141 and the IQ data received by the antenna Ant2 that has been output by the DeMUX processing unit 130 and outputs the selected IQ data to the external device as the IQ data for the antenna Ant2.

In the case where the selection processing unit 142 has obtained the IQ data received by the antenna Ant2 from the DeMUX processing unit 130, the selection processing unit 142 outputs the IQ data to the external device. In contrast, in the case where the selection processing unit 142 is not able to obtain the IQ data received by the antenna Ant2 from the DeMUX processing unit 130, the selection processing unit 142 obtains the IQ data corresponding to the antenna Ant2 from the reconstruction processing unit 141 and outputs the IQ data to the external device.

Figure 5:
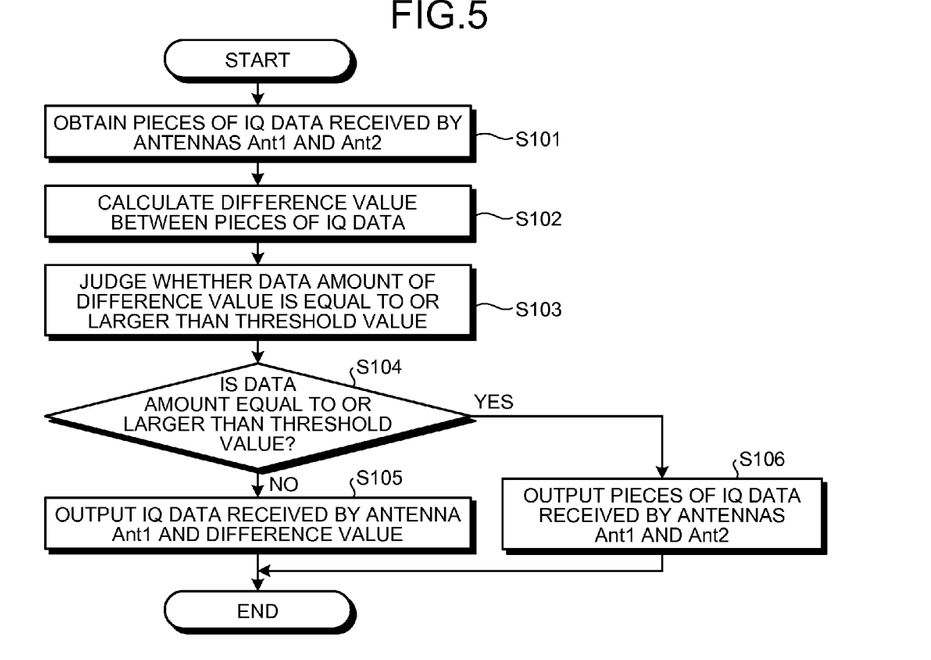
FIG. 5 is a flowchart of a processing procedure performed by an RF-IC unit according to the embodiment.

Next, a processing procedure performed by the RF-IC unit 150 according to the present embodiment will be explained. FIG. 5 is a flowchart of the processing procedure performed by the RF-IC unit 150 according to the present embodiment. As illustrated in FIG. 5, the RF-IC unit 150 obtains IQ data received by the antenna Ant1 and IQ data received by the antenna Ant2 (step S101) and calculates a difference value between the pieces of IQ data (step S102).

The RF-IC unit 150 then judges whether the data amount of the difference value is equal to or larger than the threshold value (step S103). In the case where the data amount of the difference value is smaller than the threshold value (step S104: No), the RF-IC unit 150 outputs the IQ data received by the antenna Ant1 and the difference value to the base band processing unit 110 (step S105). In contrast, in the case where the data amount of the difference value is equal to or larger than the threshold value (step S104: Yes), the RF-IC unit 150 outputs the IQ data received by the antenna Ant1 and the IQ data received by the antenna Ant2 to the base band processing unit 110 (step S106).

Figure 6:
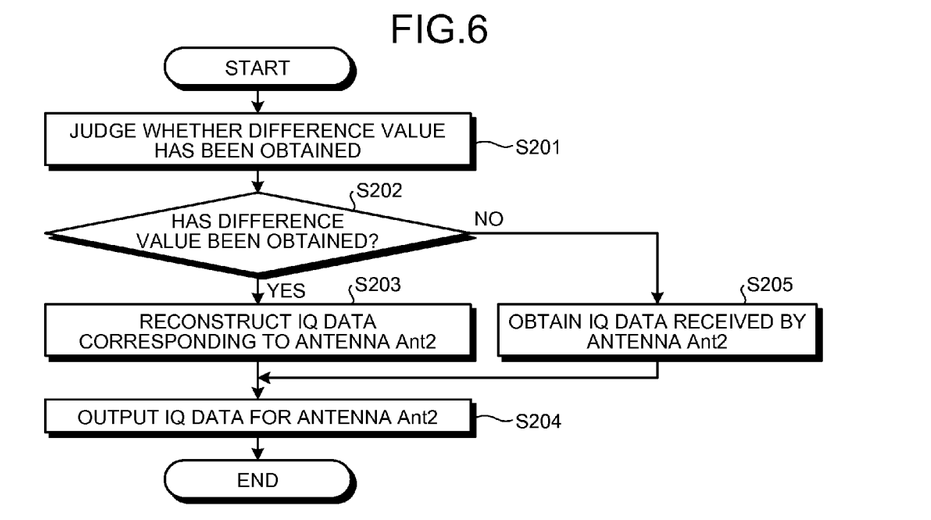
FIG. 6 is a flowchart of a processing procedure performed by the IQ data reconstructing unit according to the embodiment.

Next, a processing procedure performed by the IQ data reconstructing unit 140 according to the present embodiment will be explained. FIG. 6 is a flowchart of the processing procedure performed by the IQ data reconstructing unit 140 according to the present embodiment. As illustrated in FIG. 6, the IQ data reconstructing unit 140 judges whether a difference value has been obtained (step S201).

In the case where a difference value has been obtained (step S202: Yes), the IQ data reconstructing unit 140 reconstructs the IQ data corresponding to the antenna Ant2 based on the difference value and the IQ data received by the antenna Ant1 (step S203) and outputs the IQ data for the antenna Ant2 (step S204).

In contrast, in the case where the difference value has not been obtained (step S202: No), the IQ data reconstructing unit 140 obtains the IQ data received by the antenna Ant2 from the DeMUX processing unit 130 (step S205), and the process proceeds to step S204.

As explained above, the wireless device 100 according to the present embodiment is configured so that the RF-IC unit 150 calculates the difference value between the IQ data received by the antenna Ant1 and the IQ data received by the antenna Ant2 and transfers the difference value to the base band processing unit 110, instead of the IQ data received by the antenna Ant2. The wireless device 100 is further configured so that the base band processing unit 110 reconstructs the IQ data corresponding to the antenna Ant2, based on the difference value and the IQ data received by the antenna Ant1.

The data amount of each of the difference values is smaller than that of the IQ data received by the antenna Ant2. Thus, even if the pieces of IQ data received by the plurality of antennas and the control data are transferred by using one lane within the wireless device 100, it is possible to secure a bit width for the control data. As a result, it is possible to prevent data delays.

Of the various processes explained in the description of the embodiment, it is acceptable to manually perform all or a part of the processes that are described as being automatically performed. Conversely, it is acceptable to automatically perform, by using a publicly known method, all or a part of the processes that are described as being manually performed. In addition, it is acceptable to arbitrarily apply a modification to any of the processing procedures, the controlling procedures, the specific names, and the information including the various types of data and the various parameters that are illustrated in the text above and the drawings, unless otherwise noted.

When the wireless device according to an aspect of the present invention is being used, it is possible to prevent data delays even if the pieces of data that have been received by the plurality of antennas are transferred by using one lane.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A wireless device comprising:
   a difference calculator that obtains first data representing a signal received by a first antenna and second data representing a signal received by a second antenna and calculates a difference value between the first data and the second data;
   a transferring unit that transfers the first data and the difference value to a receiving unit; and a reconstructing unit that, when the first data and the difference value from the transferring unit are received, reconstructs the second data, based on the first data and the difference value.

2. The wireless device according to claim 1, wherein the transferring unit converts the first data and the difference value into signals and transfers the signals resulting from the conversion alternately to the receiving unit.

3. The wireless device according to claim 1, wherein the transferring unit compares a data amount of the difference value and a threshold value, and the transferring unit transfers the first data and the difference value to the receiving unit if the data amount of the difference value is smaller than the threshold value.

4. The wireless device according to claim 1, wherein the transferring unit compares a data amount of the difference value and a threshold value, and the transferring unit transmits the second data instead of the difference value if the data amount of the difference value is equal to or larger than the threshold value.

5. A transferring method performed in a wireless device comprising:
   obtaining first data representing a signal received by a first antenna and second data representing a signal received by a second antenna;
   calculating a difference value between the first data and the second data;
   transferring the first data and the difference value to a receiving unit; and
   reconstructing, when the first data and the difference value are received, the second data based on the first data and the difference value.

6. The transferring method according to claim 5, wherein the transferring includes converting the first data and the difference value into signals and transferring the signals resulting from the conversion alternately to the receiving unit.

7. The transferring method according to claim 5, wherein the transferring includes:
   comparing a data amount of the difference value and a threshold value; and
   transferring the first data and the difference value to the receiving unit if the data amount of the difference value is smaller than the threshold value.

8. The transferring method according to claim 5, wherein the transferring includes:
   comparing a data amount of the difference value and a threshold value; and
   transmitting the second data instead of the difference value if the data amount of the difference value is equal to or larger than the threshold value.

* * * * *